United States Patent [19]

Falk

[11] 4,071,879
[45] Jan. 31, 1978

[54] REVERSIBLE CURRENT APPARATUS
[75] Inventor: Jerry L. Falk, Medway, Mass.
[73] Assignee: GTE Sylvania Incorporated, Stamford, Conn.
[21] Appl. No.: 745,802
[22] Filed: Nov. 19, 1976
[51] Int. Cl.² ............................................ H03K 17/66
[52] U.S. Cl. ....................................... 361/245; 179/86
[58] Field of Search .................. 361/245, 246; 179/86; 307/254

[56] References Cited
U.S. PATENT DOCUMENTS

| | | | |
|---|---|---|---|
| 2,821,639 | 1/1958 | Bright et al. ...................... | 361/245 X |
| 3,823,271 | 7/1974 | Carbrey ............................... | 179/86 |
| 3,849,607 | 11/1974 | Carbrey ............................... | 179/86 |

Primary Examiner—Harry E. Moose, Jr.
Attorney, Agent, or Firm—David M. Keay

[57] ABSTRACT

Apparatus for producing a reversible local battery current to provide metering pulses on a two-wire telephone trunk circuit. A DC current supply produces a current of one polarity which is increased from zero to 20 milliamps over a period of 75 milliseconds by charging a capacitor, and decreased from 20 milliamps to zero also over a period of 75 milliseconds by discharging the capacitor. The DC current supply is coupled to the trunk circuit by way of a polarity reversing bridge. In response to a control signal initiating a metering pulse, control circuitry causes the capacitor to discharge, gradually reducing the DC current through the trunk circuit to zero. When the current reaches zero, the control circuitry causes the polarity reversing bridge to reverse the connections of the DC current supply to the trunk circuit. At the same time the capacitor charges, gradually increasing the DC current through the trunk circuit. Since the polarity of the bridge has been reversed, current flow in the trunk circuit, and also the potential, is opposite to the original direction. Thus, current flow in the trunk circuit is varied gradually from 20 milliamps in one direction to 20 milliamps in the opposite direction. When the control signal terminates, the apparatus operates to change the current flow in the trunk circuit gradually to 20 milliamps in the original direction.

11 Claims, 2 Drawing Figures

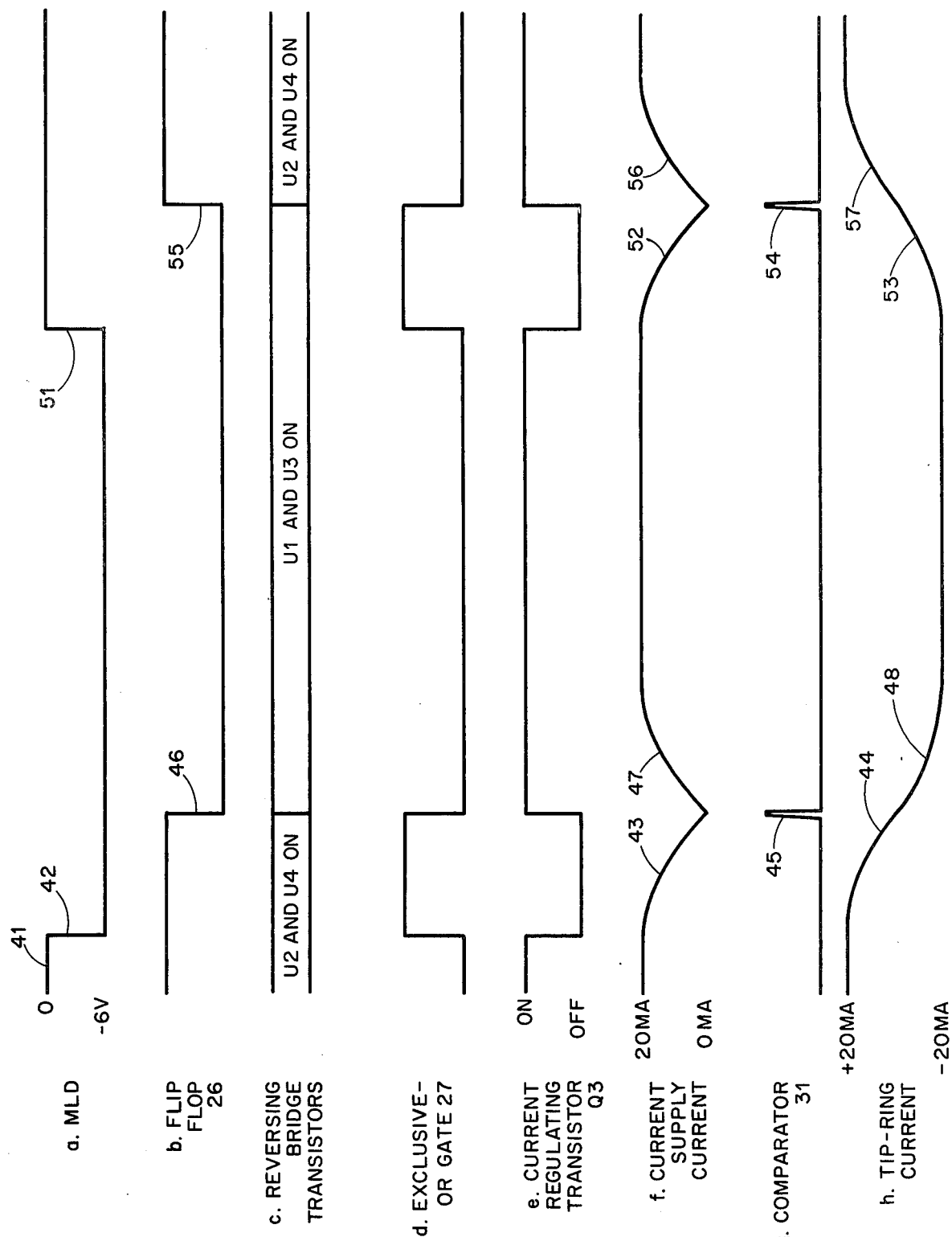

REVERSIBLE CURRENT APPARATUS

BACKGROUND OF THE INVENTION

This invention relates to apparatus for producing a reversible electric current. More particularly, it is concerned with apparatus for producing a reversible current to provide inaudible metering pulses on a two-wire telephone trunk circuit.

In telephone communication systems it is conventional to reverse the polarity of the local battery on a two-wire trunk circuit to indicate answer supervision and also to create short duration pulses on the line for remote metering purposes. Typically these pulses are approximately 250 millisecond restorations of the idle line polarity to the circuit. Since the metering pulses are transmitted over the circuit at the same time that the circuit is being used for normal conversation, techniques must be employed to insure that they do not interfere with the normal conversation being carried by the circuit.

The usual methods of accomplishing battery reversal employ relays to switch the battery polarity applied to the circuit. In order to remove audible transients generated by the steep rise and fall times of the pulses produced by employing relays, inductor-capacitor filters are employed at the far-end trunk terminations to filter the audible transients from the voice path. The use of relays introduces certain problems in systems of the foregoing type. The lifetime of a relay is relatively short, particularly when metering pulses are applied frequently and at a high rate. In addition relays are bulky and are not readily amenable to incorporation in dense packaging arrangements.

Inductor-capacitor filter networks are also large devices, and have the disadvantage of requiring tuning in order to optimize their response to a particular trunk circuit length. Furthermore, some systems have not employed the common practice of providing filters at the far-end trunk terminations, and thus have no protection from audible transients on the circuit.

SUMMARY OF THE INVENTION

An improved arrangement for providing battery reversal on two-wire telephone trunk circuits is provided by reversible current apparatus in accordance with the present invention. The apparatus employs a pair of output terminals and a current source means for producing a DC current of one polarity. A current reversing means, such as a reversible bridge network, is connected to the pair of output terminals and to the current source means. The current reversing means couples the current source means to the output terminals so as to produce a DC output current of either one polarity or of the opposite polarity between the output terminals. The apparatus also includes a regulating means which is coupled to the current source means for varying the DC current produced by the current source means. A control means is coupled to the current reversing means, the current source means, and the regulating means. In response to control signals the control means causes the regulating means to vary the current produced by the current source means, and subsequently when the current source means produces a predetermined output current causes the current reversing means to reverse the polarity of the DC current between the output terminals.

By varying the output current gradually from a maximum to zero and then reversing the polarity of the current at the output terminals the apparatus may be employed to provide reversal of local battery current without steep rise and fall times. Thus, audible transients on trunk circuits are avoided and the need for filter networks at the far-end trunk terminations is eliminated.

BRIEF DESCRIPTION OF THE DRAWINGS

Additional objects, features, and advantages of apparatus for producing a reversible current in accordance with the present invention will be apparent from the following detailed discussion together with the accompanying drawings wherein:

FIG. 2 is a timing diagram useful in explaining the operation of the apparatus of FIG. 1 in producing a metering pulse.

Figure 1:
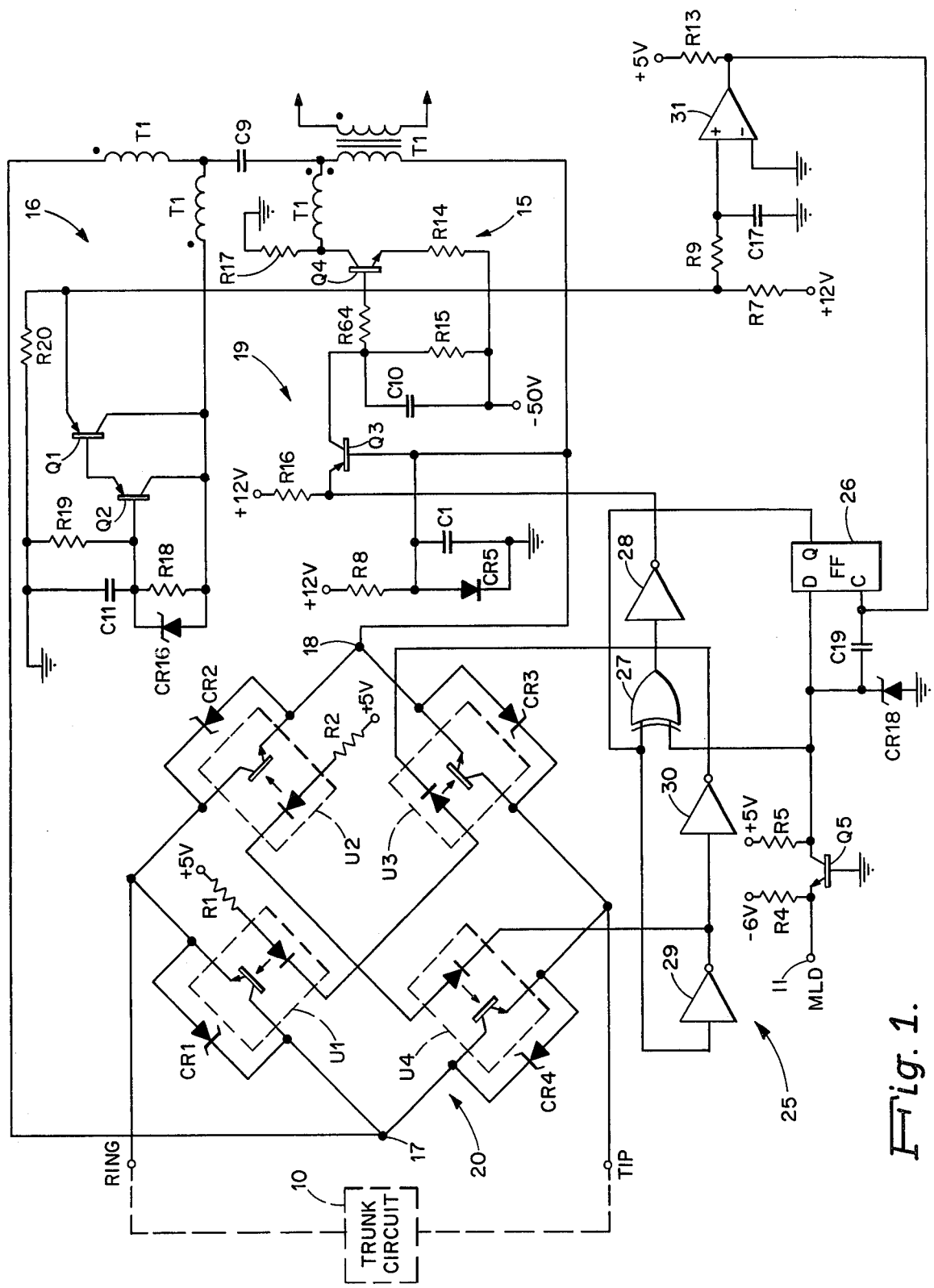
FIG. 1 is a schematic circuit diagram of a reversible current apparatus in accordance with the present invention.

Standard well-known symbols and notations are employed in the drawings to designate various logic components.

DETAILED DESCRIPTION OF THE INVENTION

FIG. 1 is a schematic circuit diagram illustrating current reversible apparatus in accordance with the present invention. The apparatus is shown as connected to a two-wire trunk circuit 10 at TIP and RING terminals to form a complete circuit loop. Audio signals pass through the apparatus in both directions between the TIP and RING terminals and the output terminals of a transformer T1. The output terminals of the transformer T1 may be connected to a two-wire to four-wire hybrid network in a conventional manner for transmission over four-wire trunks. The apparatus as illustrated passes audio signals in both directions and also provides DC battery current of either polarity to the trunk circuit 10. The polarity or direction of current flow of the DC current is controlled by MLD input signals applied at a control input terminal 11.

The DC battery current is provided by a supply circuit including a current source 15 and a current sink 16. These circuits produce output current of one polarity between terminals 17 and 18. The amount of current is changed from zero to 20 milliamps and from 20 milliamps to zero by a current regulating network 19. A polarity reversing bridge 20 connects terminal 17 to the TIP terminal and terminal 18 to the RING terminal to provide a DC current of one polarity through the trunk circuit 10, or alternatively connects terminal 17 to the RING terminal and terminal 18 to the TIP terminal to produce a DC current of the opposite polarity through the trunk circuit 10. The apparatus includes control circuitry 25 which responds to MLD input signals at the control input terminal 11 to control the current regulating network 19 and the polarity reversing bridge 20.

Under normal operating conditions when the called party has answered, the MLD signal is at zero volts and the apparatus is providing 20 milliamps of DC battery current to the trunk circuit 10 with a positive polarity between the TIP and RING terminals. A metering pulse (typically of 250 milliseconds duration) is initiated by the MLD signal dropping to −6 volts. This occurrence causes the current regulating network 19 to reduce the DC current from 20 milliamps to zero over a period of 75 milliseconds. The zero current level is detected by a detector including a voltage comparator circuit 31 which causes the control circuitry 25 to switch the connections of the polarity reversing bridge 20 with terminal 17 connected to the RING terminal and terminal 18 connected to the TIP terminal. At the same time, the control circuitry 25 causes the current regulating network 19 to increase the DC current produced by the source 15 from zero to 20 milliamps over a period of 75 milliseconds. Thus, the DC current through the trunk circuit loop is changed from 20 milliamps in one direction to 20 milliamps in the opposite direction in a period of 150 milliseconds. When the MLD signal reverts to the zero level, the apparatus operates to restore the DC loop current to its original direction of flow in a period of 150 milliseconds.

The DC current source 15 is of straightforward design employing an NPN transistor Q4 having its emitter connected to a −50 volt supply through a resistor R14 and its collector connected to ground through a resistor R17. The collector is also connected by way of two windings of the transformer T1 to terminal 18.

The DC current sink 16 is a straightforward arrangement of two PNP transistors Q1 and Q2 coupled to ground as shown. The emitters of transistors Q1 and Q2 are connected by way of two windings of transformer T1 to terminal 17. A capacitor C9 is connected between the windings of transformer T1 in the DC source 15 and those in the DC sink 16 in order to block the flow of DC battery current through the transformer while permitting the passage of audio signals. The transformer is of straightforward design employing opposing windings to cancel the net DC current flux in the transformer while allowing audio components of the signal to be passed by virtue of interaction with the capacitor C9 thereby passing signals in phase to the secondary winding.

The DC current regulating network 19 is connected to the base of transistor Q4 of the current source 15. The network includes a parallel resistor-capacitor R15-C10 combination which is connected between the −50 volt supply and a resistor 64 connected to the base of transistor Q4. A current regulating transistor Q3 is connected in series between a +12 volt supply and a resistor R16 and the juncture of capacitor C10, resistor R15, and resistor R64. When transistor Q3 is biased from off to on, capacitor C10 charges, increasing current flow through transistor Q4 and thereby increasing the DC battery current from zero to a maximum of 20 milliamps over a period of 75 milliseconds. When transistor Q3 is switched from on to off, capacitor C10 discharges gradually, causing the DC loop current to drop from 20 milliamps to zero over a period of 75 milliseconds. The impedances coupled to the charge and discharge paths of capacitor C10 cause the waveforms of increasing and decreasing battery current to be substantially linear along the major portion of their lengths.

The constant polarity output current produced by the source 15 and the sink 16 between terminals 17 and 18 is applied to the polarity reversing bridge 20. Terminals 17 and 18 are the input terminals to the bridge and the TIP and RING terminals which may be connected to a two-wire trunk circuit 10 are the output terminals. The polarity reversing bridge includes four arms each employing an optically coupled transistor U1 through U4 connected between an input and an output terminal as illustrated in FIG. 1. An optically coupled transistor provides a high impedance to current flow or an open switch condition when its associated light emitting diode is not energized. It provides a low impedance or closed switch condition when its associated light emitting diode is energized. The light emitting diodes of optically coupled transistors U1 and U3, which are in opposite arms of the bridge, are connected in series between a +5 volt supply and the control cicuitry 25. The light emitting diodes of the other two optically coupled transistors U2 and U4, also in opposite arms of the bridge, are connected between a +5 volt supply and the control circuitry 25. Zener diodes CR1-CR4 are connected in parallel across each of the optically coupled transistors in order to protect them from voltage transients introduced from the terminating trunk circuit.

The control circuitry 25 includes a D-type flip-flop 26 which determines the particular connections of the polarity reversing bridge 20 and thus, in effect, stores an indication of its operating state. The MLD signal at the control input terminal 11 is applied to the D input of the flip-flop 26 by way of a transistor Q5. The output of transistor Q5 is also applied to an exclusive-OR gate 27. The other input to the exclusive-OR gate is the Q output of the flip-flop 26. The output of the exclusive-OR gate 27 is applied through an inverter 28 to the base of the current regulating transistor Q3. The Q output of flip-flop 26 is applied by way of an inverter 29 to the light emitting diodes of the optically coupled transistors U2 and U4 of the bridge 20 and by way of the inverter 29 and another inverter 30 in series to the light emitting diodes of optically coupled transistors U1 and U3 of the bridge. Thus, when the output of either inverter 29 or inverter 30 is low, the light emitting diodes connected to it are energized causing the associated optically coupled transistors to provide the appropriate low impedance paths between terminals 17 and 18 and the TIP and RING terminals.

The + input of the comparator circuit 31 is connected to the emitter of transistor Q1 of the DC sink 16 by way of a resistor R9. The emitter is also connected to ground through a resistor R20 and to a +12 volt supply through a resistor R7. The − input of the comparator circuit 31 is connected to ground. This arrangement produces a positive signal at the + input when the DC loop current is zero. Thus, the comparator circuit 31 produces a positive-going indication when the DC current reaches zero. This output signal is applied to the clock input of flip-flop 26 causing it to switch operating states in accordance with the signal present at its D input.

Flip-flop 26 also has a clock input from transistor Q5 by way of capacitor C19. This arrangement produces a positive-going clock signal to the flip-flop 26 when the MLD signal changes during a condition of zero current in the trunk circuit loop. Such a condition occurs when the trunk circuit releases the loop. This action insures that flip-flop 26 and consequently the polarity reversing bridge 20 are set to the proper states for normal operation upon termination of a call. Thus, if the trunk circuit loop is not closed for some reason and therefore the comparator circuit 31 does not provide a positive-going signal to the flip-flop 26, the control circuitry is self-clearing and establishes the proper DC battery polarity for normal operating conditions.

The manner in which the apparatus as described responds to MLD control signals to generate metering pulses on a trunk circuit may best be understood by reference to the timing diagram of FIG. 2. Under usual normal operating conditions during a telephone conversation the MLD signal level is relatively high, zero volts, as shown at 41 in item a of FIG. 2, and flip-flop 26 is in the set condition with its Q output high (item b of FIG. 2). With the Q output high the output of the inverter 29 is low and the output of the inverter 30 is high. Thus, the light emitting diodes of optically coupled transistors U2 and U4 are energized and the light emitting diodes of optically coupled transistors U1 and U3 are deenergized. Optically coupled transistors U2 and U4 are on (item c of FIG. 2) acting as closed switches and optically coupled transistors U1 and U3 are off acting as open switches. The resulting loop current through the trunk circuit 10 is relatively positive from the TIP to the RING terminals. Since both inputs to the exclusive-OR gates 27 are high, the series combination of exclusive-OR gate 27 and inverter 28 holds the current regulating transistor Q3 on (items d and e of FIG. 2) so that the maximum output current of 20 milliamps is being produced by the DC current supply as shown in items f and h of FIG. 2.

On the negative-going edge 42 of a −6 volt MLD control pulse, the output of transistor Q5 goes low. Therefore, the output of the exclusive-OR gate 27 goes high causing the current regulating transistor Q3 to be switched off (items d and e of FIG. 2). Capacitor C10 discharges, gradually reducing the potential at the base of transistor Q4 and thus the flow of current in the loop as illustrated at 43 in item f and at 44 in item h of FIG. 2.

When the current produced by the DC current supply is reduced to zero, the voltage drop across resistor R20 is such that the level at the + input to the comparator circuit 31 is positive and the output of comparator circuit 31 goes positive as shown at 45 in item g of FIG. 2. The leading edge of this pulse triggers the flip-flop 26, which has a low input at its D input, to its reset condition. The Q output of flip-flop 26 goes low as shown at 46 in item b of FIG. 2.

When the Q output of flip-flop 26 goes low, the output of inverter 29 becomes high and that of inverter 30 becomes low. Thus the light emitting diodes of optically coupled transistors U2 and U4 become deenergized and those of optically coupled transistors U1 and U3 become energized causing their associated transistors to switch from low to high and from high to low impedances, respectively, as illustrated in item c of FIG. 2. The polarity of the TIP and RING terminals is therefore reversed.

The low Q output signal for the flip-flop 26 to the exclusive-OR gate 27 causes the output of the exclusive-OR gate 27 to go low switching on the current regulating transistor Q3. Capacitor C10 charges causing the output of the DC current supply to increase from zero to 20 milliamps as shown at 47 of item f of FIG. 2. Since the connections between terminals 17 and 18 and the TIP and RING terminals have been reversed by the polarity reversing bridge, current flow through the trunk circuit loop is in the opposite direction as shown at 48 of item h of FIG. 2. Thus, the polarity or direction of current flow of battery current is reversed to provide a −20 milliamps TIP to RING current when the capacitor C10 becomes fully charged.

At the termination of the 250 millisecond MLD signal for generating a metering pulse the MLD signal returns to zero as illustrated at 51 in item a of FIG. 2. The output of transistor Q5 becomes high causing the output of the exclusive-OR gate 27 to become high turning off the current regulating transistor Q3 as shown in items d and e of FIG. 2. With transistor Q3 off capacitor C10 discharges causing the output current from the current source 15 to decrease as shown at 52 of item f of FIG. 2. The loop current in the trunk circuit 10 is consequently reduced as illustrated at 53 of item h of FIG. 2.

When the output of the DC current supply is reduced to zero, the output of the comparator circuit 31 again becomes positive producing a clock pulse 54 to the flip-flop 26. Since the D input to the flip-flop 26 is high, the leading edge of the clock pulse causes the flip-flop 26 to be triggered to the set condition and its Q output to become high as shown at 55. This signal causes the output of the inverter 29 to go low and the output of the inverter 30 to become high thus turning the optically coupled transistors U1 and U3 off and U2 and U4 on (item c of FIG. 2). The TIP and RING connections to terminals 17 and 18 are thus reversed.

The high Q output from the flip-flop 26 also causes the output of the exclusive-OR gate 27 to go low turning the current regulating transistor Q3 on (items d and e of FIG. 2). Capacitor C10 charges causing the DC current produced by the source 15 to increase as shown at 56. Since the connections between the terminals 17 and 18 and the TIP and RING terminals have been reversed, the increasing current flows in the direction of positive polarity between the TIP and RING terminals as shown at 57. When the output current reaches 20 milliamps, conditions have been restored to the original normal operating conditions prior to the receipt of the MLD metering pulse control signal.

A specific embodiment of the current reversing apparatus in according with the invention as illustrated in FIG. 1 was constructed employing the components listed below.

| | |
|---|---|
| Optically coupled transistors U1-U4 | MOC8050 |
| Inverters 28, 29, and 30 | SN7406N |
| Exclusive-OR gate 27 | SN7486N |
| Flip-flop 26 | SN7474N |
| Comparator 31 | LM219D |
| Transistors Q1, Q2, and Q3 | 2N5679 |
| Transistor Q4 | 2N3440 |
| Transistor Q5 | 2N2222 |
| Diodes CR1-CR4 | 1N4759A |
| Diode CR5 | 1N3612 |
| Diode CR16 | 1N4730A |
| Diode CR18 | 1N750A |
| Capacitor C1 | 1 μF |
| Capacitor C9 | 3.3 μF |
| Capacitor C10 | 33 μF |
| Capacitor C11 | 10 μF |
| Capacitor C17 | .047 μF |
| Capacitor C19 | 1000 pF |
| Resistor R1 | 68Ω |
| Resistor R2 | 68Ω |
| Resistor R4 | 560Ω |
| Resistor R5 | 2.7 KΩ |
| Resistor R7 | 10 KΩ |
| Resistor R8 | 510Ω |
| Resistor R9 | 220 KΩ |
| Resistor R13 | 2.7 KΩ |
| Resistor R14 | 121Ω |
| Resistor R15 | 1 KΩ |
| Resistor R16 | 2670Ω |
| Resistor R17 | 47.5 KΩ |
| Resistor R18 | 47.5 KΩ |
| Resistor R19 | 82.5 KΩ |
| Resistor R20 | 237Ω |
| Resistor R64 | 1.2 KΩ |

The apparatus was triggered to produce metering pulses by MLD pulses at −6 volts below the normal zero volt level. The MLD control pulses were of 250 milliseconds duration. The loop current produced by the DC current source 15 and sink 16 increased from zero to a maximum of 20 milliamps in 75 milliseconds, and also decreased from 20 milliamps to zero in 75 milliseconds. The apparatus thus provided a reversal of the 20 milliamp battery current in the loop over a 150 millisecond transition period. By virtue of the gradual rise and fall times no transient switching frequency components were generated to interfere with normal conversation and, therefore, no filtering was required. In addition, the apparatus avoided the use of relays and the consequent problems of size, lifetime, and reliability. The use of optically coupled transistors in the polarity reversing bridge provided electrical isolation between the control circuitry and the DC current supply. Thus, the relatively high voltages of the current supply and bridge were controlled with low level logic signals and switching was accomplished without disturbing the balance of the apparatus.

While there has been shown and described what is considered a preferred embodiment of the present invention, it will be obvious to those skilled in the art that various changes and modifications may be made therein without departing from the invention as defined in the appended claims.

What is claimed is:

1. Apparatus for producing a reversible current including in combination
    a pair of output terminals;
    current source means for producing a DC current of one polarity;
    current reversing means connected to said pair of output terminals and to said current source means, said current reversing means being operable to couple said current source means to said output terminals so as to produce a DC output current of one polarity between said output terminals, and being operable to couple said current source means to said output terminals so as to produce a DC output current of the opposite polarity between said output terminals;
    regulating means coupled to said current source means for varying the DC current produced by said current source means; and
    control means coupled to said current reversing means, to said current source means, and to said regulating means; said control means being operable in response to control signals applied thereto to cause said regulating means to vary the current produced by the current source means and subsequently in response to said current source means producing a predetermined output current to cause said current reversing means to reverse the polarity of the DC current between said output terminals.

2. Apparatus for producing a reversible current including in combination
    a pair of output terminals;
    current source means for producing a DC current of one polarity;
    current reversing means connected to said pair of output terminals and to said current source means for coupling said current source means to said output terminals so as to produce a DC output current of one polarity between said output terminals in response to a first input condition being applied thereto, and for coupling said current source means to said output terminals so as to produce a DC output current of the opposite polarity between said output terminals in response to a second input condition being applied thereto;
    regulating means coupled to said current source means for varying the DC current produced by said current source means;
    current detection means coupled to said current source means for producing an indication when said current source means produces a predetermined output current; and
    reversing control means coupled to said current detection means, to said regulating means, and to said current reversing means, and adapted to receive a first or a second control signal;
    said reversing control means being operable to cause said regulating means to vary the current produced by the current source means in response to a second control signal being applied to the reversing control means when a DC output current of said one polarity is being produced between said output terminals, and subsequently to apply a second input condition to said current reversing means in response to an indication from said current detection means; and
    said reversing control means being operable to cause said regulating means to vary the current produced by the current source means in response to a first control signal being applied to the reversing control means when a DC output current of said opposite polarity is being produced between said output terminals, and subsequently to apply a first input condition to said current reversing means in response to an indication from said current detection means.

3. Apparatus in accordance with claim 2 wherein said regulating means is operable to vary the DC current produced by said current source means between a predetermined maximum value and zero.

4. Apparatus in accordance with claim 3 wherein said current detection means is operable to produce said indication when said current source means produces zero current.

5. Apparatus in accordance with claim 2 wherein said regulating means is operable to change the DC current produced by said current source means from a minimum to a maximum when a first regulating signal is applied thereto, and to change the DC current produced by said current source means from said maximum to said minimum when a second regulating signal is applied thereto;
    said reversing control means is operable to apply said first regulating signal to said regulating means when a DC current of said one polarity is being produced between said output terminals and a first control signal is being applied to the reversing control means, and when a DC current of said opposite polarity is being produced between said output terminals and a second control signal is being applied to the reversing control means; and
    said reversing control means is operable to apply said second regulating signal to said regulating means when a DC current of said one polarity is being produced between said output terminals and a second control signal is being applied to the reversing control means, and when a DC current of said opposite polarity is being produced between said output terminals and a first control signal is being applied to the reversing control means.

6. Apparatus in accordance with claim 5 wherein said current detection means is operable to produce said indication when said current source means produces said minimum current.

7. Apparatus in accordance with claim 5 wherein said reversing control means includes flip-flop means coupled to said current detection means and having first and second operating states;

said flip-flop means being operable to be switched from the first operating state to the second operating state in response to an indication from the current detection means while a second control signal is being applied thereto, and to be switched from the second operating state to the first operating state in response to an indication from the current detection means while a first control signal is being applied thereto;

means coupling said flip-flop means to said current reversing means and operable to apply said first input condition thereto when said flip-flop means is in said first operating state, and to apply said second input condition thereto when said flip-flop means is in said second operating state; and gate means coupled to said flip-flop means and to said regulating means;

said gate means being operable to apply a first regulating signal to said regulating means when said flip-flop means is in said first operating state and a first control signal is being applied thereto, and when said flip-flop means is in said second operating state and a second control signal is being applied thereto; and said gate means being operable to apply a second regulating signal to said regulating means when said flip-flop means is in said first operating state and a second control signal is being applied thereto, and when said flip-flop means is in said second operating state and a first control signal is being applied thereto.

8. Apparatus in accordance with claim 7 wherein said current source means has a control connection and the DC current produced by the current source means is proportional to the voltage at the control connection; and said regulating means includes
a first source of reference potential,
a resistance-capacitance network connected between the control connection of the current source means and said first source of reference potential,
a second source of reference potential, and
current regulating means coupled between said second source of reference potential and the control connection of the current source means,
said current regulating means being coupled to said gate means and being in a conducting condition in response to a first regulating signal and being in a non-conducting condition in response to a second regulating signal.

9. Apparatus in accordance with claim 8 wherein
the minimum current produced by said current source means is zero.

10. Apparatus in accordance with claim 9 wherein
said current detection means is operable to produce said indication when said current source means produces zero current.

11. Apparatus in accordance with claim 8 wherein said current reversing means includes first and second output connections, each connected to a different one of said output terminals;
first and second input terminals connected to said current source means;
a first light activated switching device connected between one of said input connections and one of said output connections;
a second light activated switching device connected between the other of said input connections and said one of said output connections;
a third light activated switching device connected between said other of said input connections and the other of said output connections;
a fourth light activated switching device connected between said one of said input connections and said other of said output connections;
first, second, third, and fourth light emitting devices, each associated with a respective light activated switching device;
each of said light activated switching devices providing a high impedance to current flow when its associated light emitting device is deenergized and providing a low impedance to current flow when its associated light emitting device is energized;
first means coupled to said flip-flop means and to said first and third light emitting devices for causing said first and third light emitting devices to be energized when the flip-flop means is in the second operating state and to be deenergized when the flip-flop means is in the first operating state; and
second means coupled to said flip-flop means and to said second and fourth light emitting devices for causing said second and fourth light emitting devices to be energized when the flip-flop means is in the first operating state and to be deenergized when the flip-flop means is in the second operating state.

* * * * *